United States Patent
Scott et al.

(10) Patent No.: US 6,649,881 B2
(45) Date of Patent: Nov. 18, 2003

(54) ELECTRIC WATER HEATER WITH PULSED ELECTRONIC CONTROL AND DETECTION

(75) Inventors: Allen Scott, Jonesborough, TN (US); William Stout, Bluff City, TN (US)

(73) Assignee: American Water Heater Company, Johnson City, TN (US)

( * ) Notice: Subject to any disclaimer, the term of this patent is extended or adjusted under 35 U.S.C. 154(b) by 78 days.

(21) Appl. No.: 10/001,434

(22) Filed: Oct. 23, 2001

(65) Prior Publication Data

US 2002/0125241 A1 Sep. 12, 2002

Related U.S. Application Data

(63) Continuation-in-part of application No. 09/578,087, filed on May 24, 2000, now Pat. No. 6,265,699, and a continuation-in-part of application No. 09/090,532, filed on Jun. 4, 1998, now Pat. No. 6,308,009.

(51) Int. Cl.[7] .................................................. H05B 1/02
(52) U.S. Cl. ........................ 219/492; 219/481; 219/497; 392/435; 392/441
(58) Field of Search ................................. 219/492, 497, 219/483–486, 501, 505, 481; 392/454, 441, 435; 374/102, 104

(56) References Cited

U.S. PATENT DOCUMENTS

| | | | | |
|---|---|---|---|---|
| 3,789,190 A | * | 1/1974 | Orosy et al. ................ | 219/497 |
| 4,901,061 A | * | 2/1990 | Twerdochlib ............... | 340/604 |
| 5,449,884 A | * | 9/1995 | Lee ............................ | 219/497 |
| 5,723,846 A | * | 3/1998 | Koether et al. ............. | 219/497 |
| 5,968,393 A | * | 10/1999 | Delamine ................... | 219/492 |

* cited by examiner

*Primary Examiner*—Mark Paschall
(74) *Attorney, Agent, or Firm*—Piper Rudnick LLP

(57) ABSTRACT

The present invention is directed to a water heater which includes a water container; an element located to heat water in the water container; a sensor located to sense temperature proximate the element; and a controller connected to the element and the sensor, the controller being programmed to energize the element with at least one electrical pulse over a predetermined time interval, comparing temperature information received from the sensor with a predetermined temperature, and disengaging the element in the event that the temperature received from the sensor is greater than a predetermined temperature for the predetermined time interval.

49 Claims, 7 Drawing Sheets

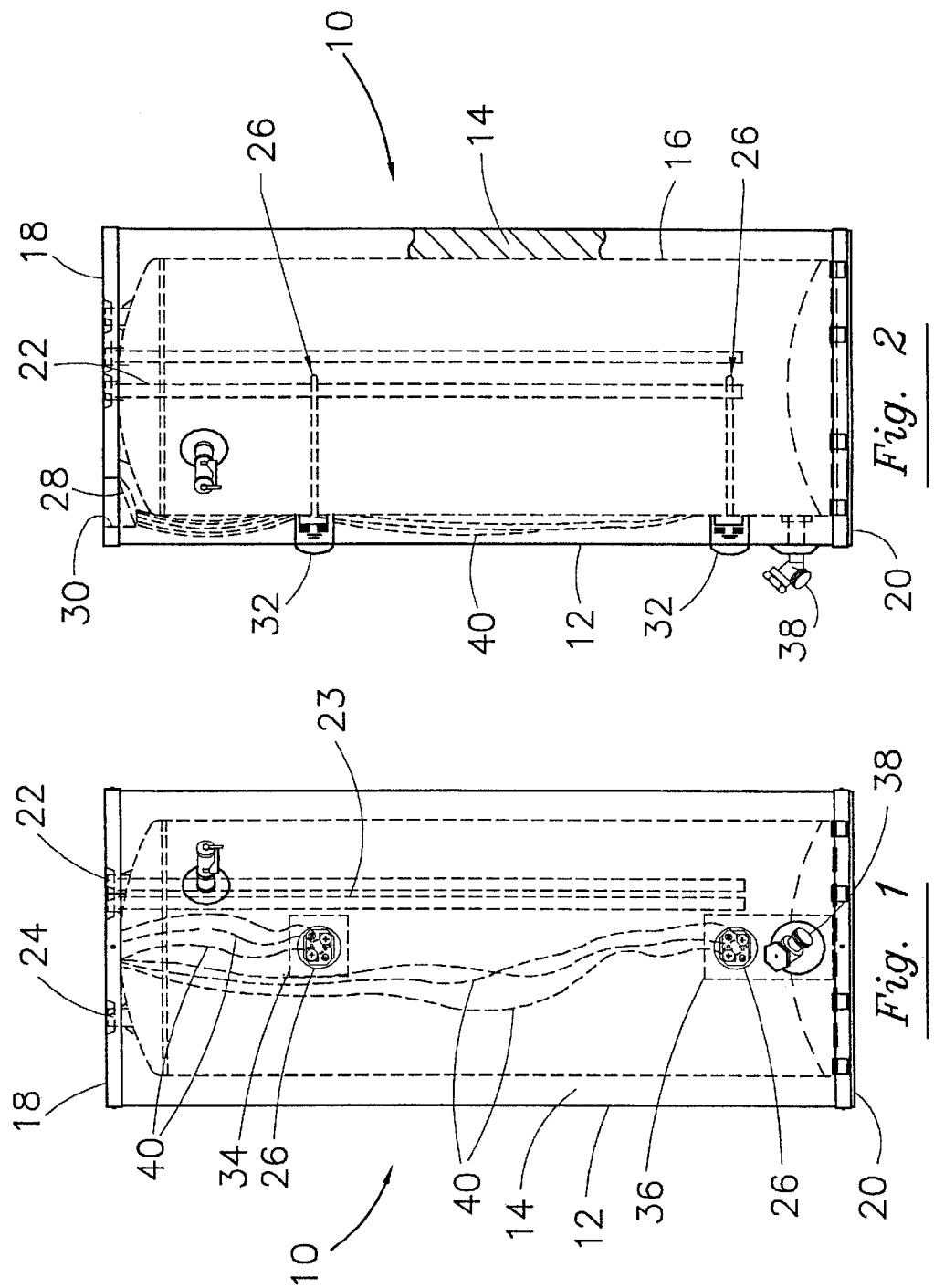

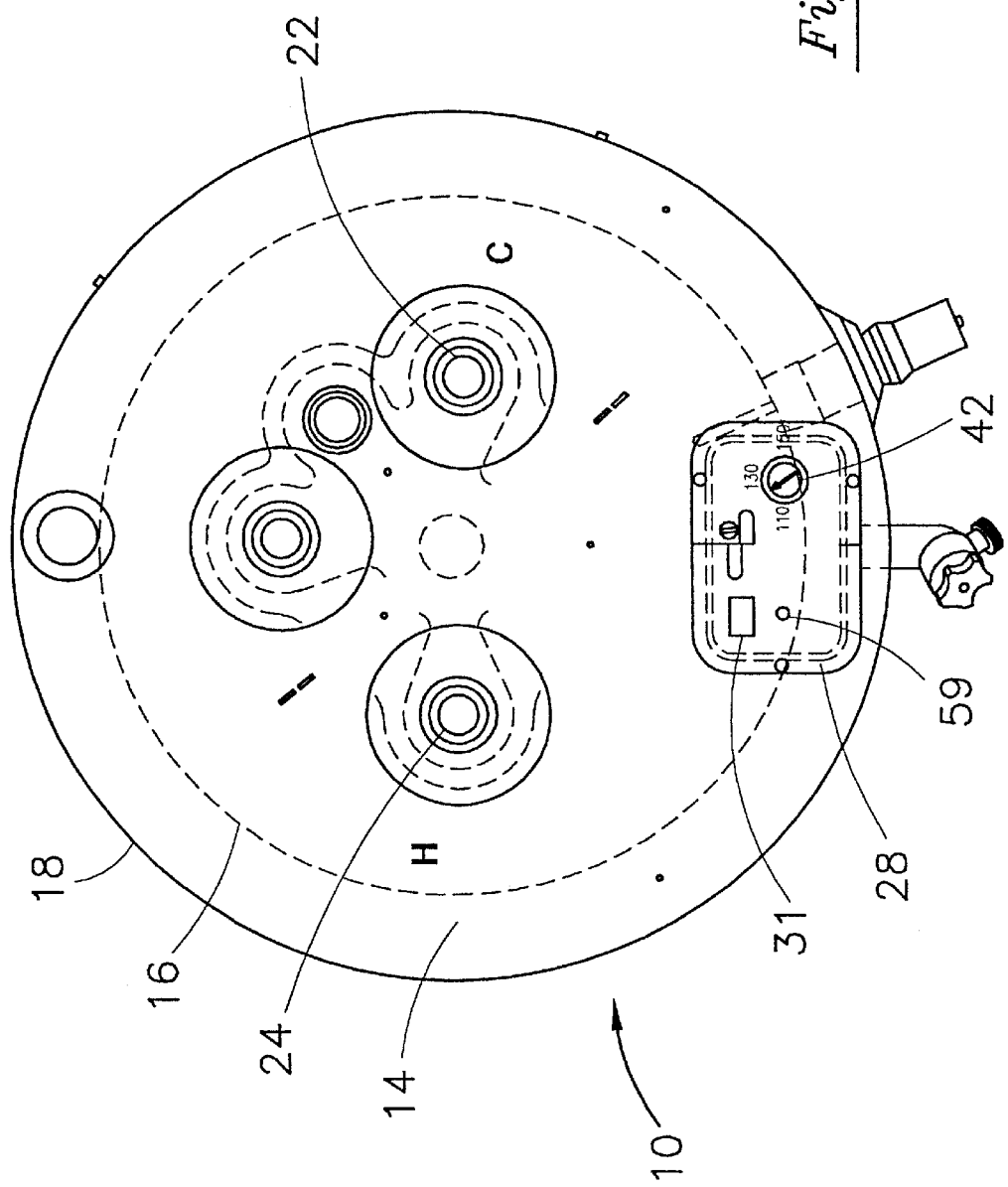

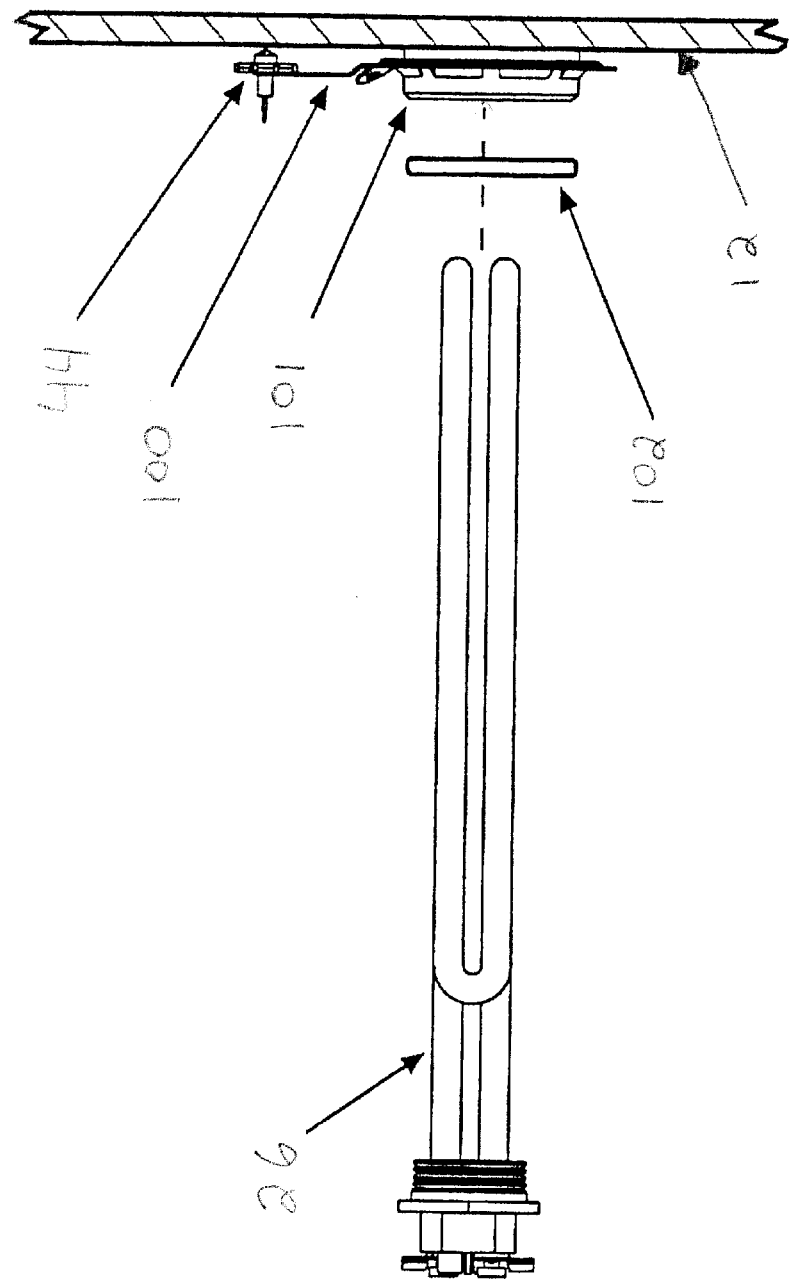

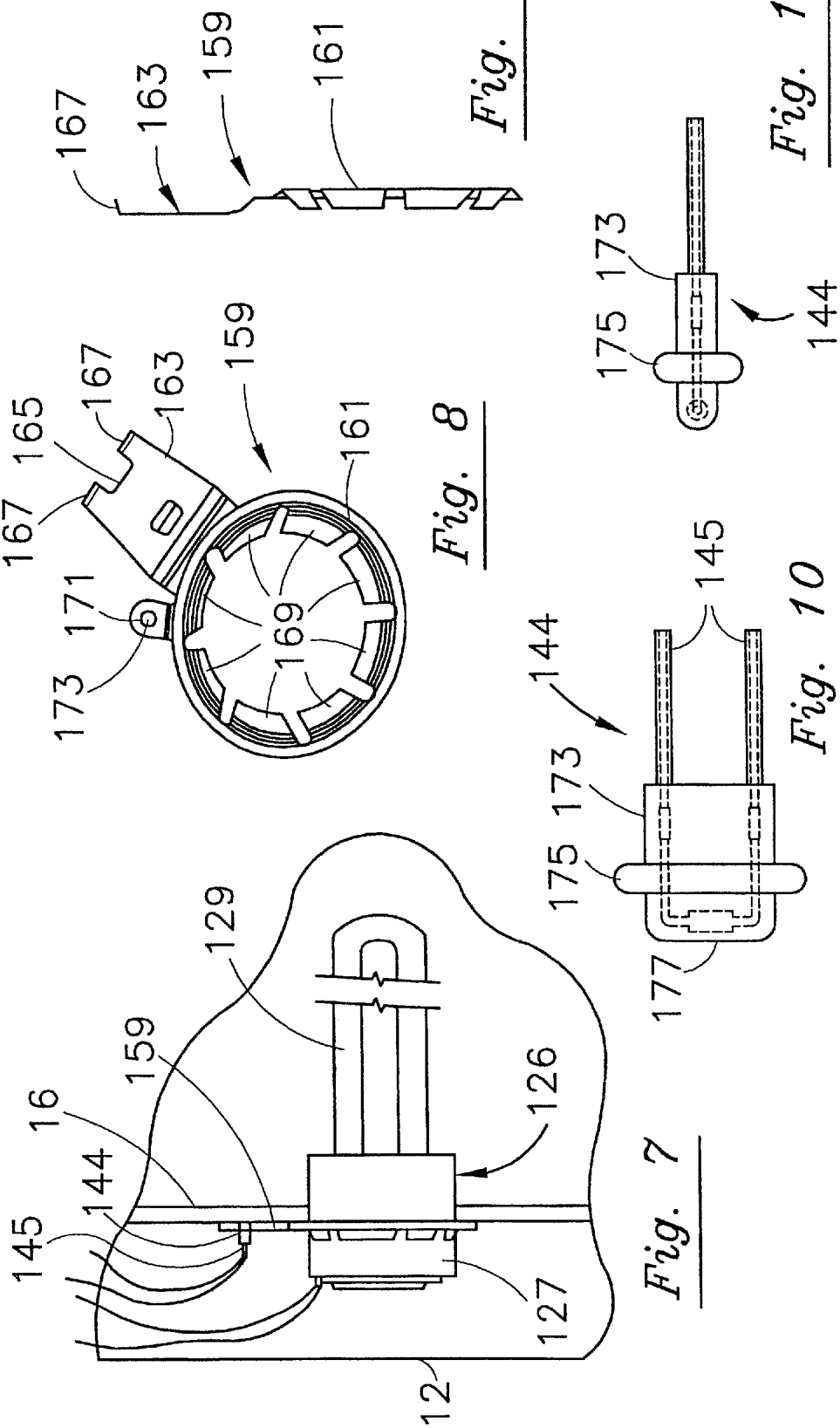

ELECTRIC WATER HEATER WITH PULSED ELECTRONIC CONTROL AND DETECTION

This application is a Continuation In Part of U.S. patent application Ser. No. 09/578,087 filed May 24, 2000, now U.S. Pat. No. 6,265,699 and a Continuation In Part of U.S. patent application Ser. No. 09/090,532 filed Jun. 4, 1998 now U.S. Pat. No. 6,308,009

FIELD OF THE INVENTION

This invention relates to an electric water heater, particularly to an electric water heater having an electronic control and detection system that greatly reduces expense and improves operating efficiencies.

BACKGROUND OF THE INVENTION

Typical electric water heaters are constructed with one or two electric-powered heating elements to heat water in the water tank, depending on the size and utilization of the water heater. Each element is ordinarily mounted onto a side wall of the tank. Further, in designs incorporating two elements, the elements are typically mounted onto the tank at spaced separation from one another. There are a number of disadvantages associated with such constructions. Element malfunction is not easily detected and is also costly since monitoring devices are required in the overall design. Also, the monitoring devices themselves can malfunction and not detect element failure. In addition, it is often difficult to identify the source of a malfunction, which works to increase the time required for repair and/or replacement of a defective or malfunctioning part.

Another significant problem with present construction is the difficulty of protecting against "dry fired" elements. "Dry fire" occurs when power is applied to a heating element without water surrounding the element. Such dry firing rapidly causes damage to the heating element, thereby sharply reducing its useful life span. In most instances, dry firing can cause immediate failure of the element.

Dry fire often occurs because electric water heaters typically use heating elements that have watt densities that are usually too high to allow operation in air without damage. These less expensive elements will burn out if energized in air for as little as 30 seconds. This fact causes a problem during installation or service of electric heaters because if the installer forgets and switches on the power before the tank is full of water, the upper element will be destroyed. These mistakes are common enough that dry fire service costs are significant and thus effort has been made to develop a heater control system that will prevent the problem.

One approach to the dry fire problem is to energize the element and watch the temperature change with the temperature sensor located just above the element. Such a system is disclosed, for example, in U.S. Pat. No. 5,442,157 to Jackson. This system works if the temperature sensor is responsive enough that a temperature change can be detected before the element reaches a temperature that causes damage. In the case of a water heater tank, however, the thickness of the steel tank wall and the rate of heating of the element are such that the sensor is normally not responsive enough.

The conventional approach is to only turn the element on for a short period and then watch for a temperature change. This works for a specific range of element watt densities but does not work when a range of different wattage elements are used. To detect a dry tank over a broad range of element types the element has to be pulsed repeatedly over a period of time. The pulsing prevents the high watt density elements from getting too hot and allows the low temperature heat input of the low watt density elements to have time to be detected.

This invention has been developed in view of the foregoing to overcome the deficiencies of the prior art.

OBJECTS OF THE INVENTION

It is an object of the invention to provide a water heater that increases energy efficiency.

It is another object of the invention to provide a water heater that protects against dry firing of heating elements.

Other objects and advantages of the invention will become apparent to those skilled in the art from the drawings, the detailed description of the invention, and the appended claims.

SUMMARY OF THE INVENTION

The water heater of the present invention includes a water container; an element located to heat water in the water container; a sensor located to sense temperature proximate the element; and a controller connected to the element and the sensor. The controller is programmed to energize the element with at least one electrical pulse over a predetermined time interval, comparing temperature information received from the sensor with a predetermined temperature, and disengaging the element in the event that the temperature received from the sensor is greater than a predetermined temperature for the predetermined time interval.

BRIEF DESCRIPTION OF THE DRAWINGS

FIG. 1 shows a schematic front elevational view of a water heater in accordance with aspects of the invention wherein dashed lines show interior portions of the water heater.

FIG. 2 shows a schematic side elevational view, taken partly in section, of the water heater of FIG. 1.

FIG. 3 shows a schematic exploded top view of the water heater shown in FIG. 1 and a user interface.

FIGS. 4A–4C show side and front elevational views of a heating element utilized in accordance with aspects of the invention.

FIG. 7 shows a schematic side elevational view, taken partly in section, of another embodiment of a heating element in accordance with the water heater of FIG. 1.

FIG. 8 is an isolated perspective view of mounting bracket in accordance with the heating element of FIG. 7.

FIG. 9 is a side elevational view of the mounting bracket of FIG. 8.

FIG. 10 is an isolated top plan view of a sensor in accordance with the heating element of FIG. 7.

FIG. 11 is a side elevational view of the sensor of FIG. 10.

DETAILED DESCRIPTION OF THE INVENTION

Figure 4A:
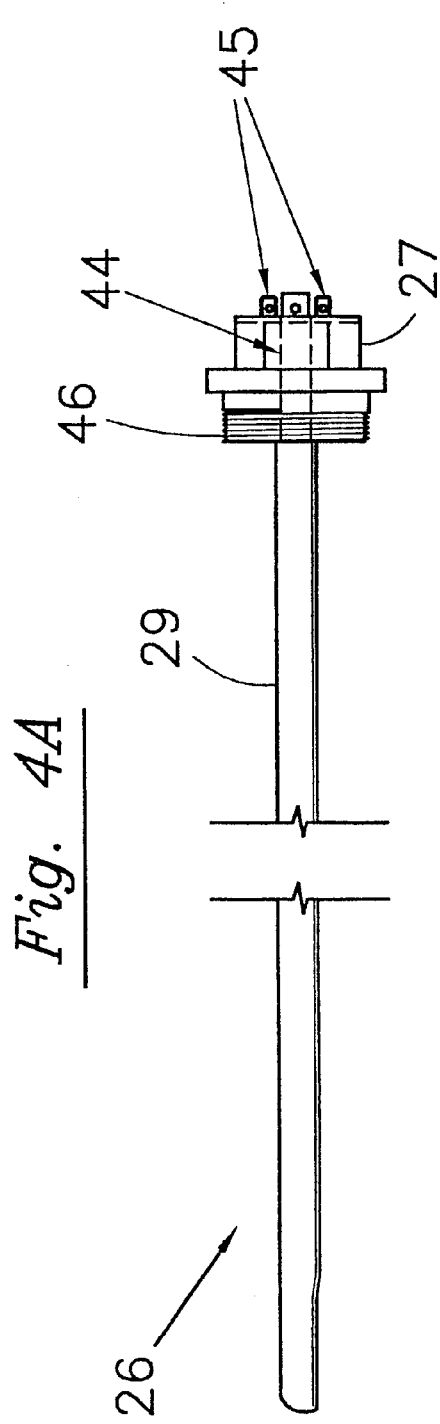
Figure 4B:
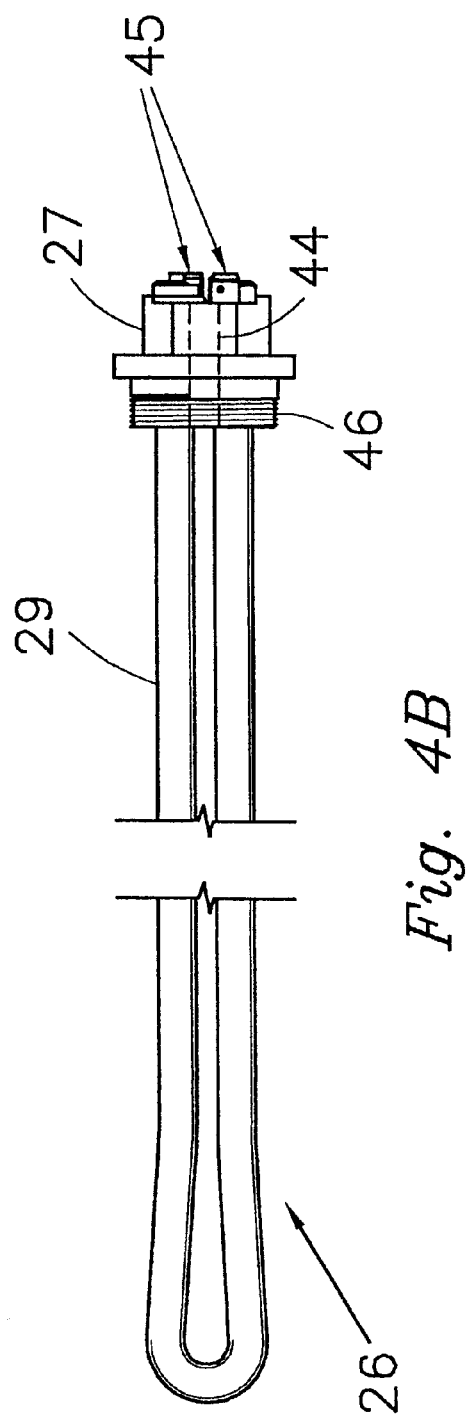

It will be appreciated that the following description is intended to refer to the specific embodiments of the invention selected for illustration in the drawings and is not intended to define or limit the invention, other than in the appended claims.

Turning now to the drawings in general and FIGS. 1–4C in particular, the number "10" designates an electric water heater of the invention. Water heater 10 includes an outer jacket 12, which surrounds foam insulation 14. Foam insulation 14 surrounds water tank 16. A top pan 18 caps jacket 12 on its upper end and bottom pan 20 caps jacket 12 on its lower end. An inlet 22 in the upper portion of tank 16 provides for cold water to enter the tank. Similarly, outlet 24 allows for hot water to exit through the upper portion of tank 16.

Water heater 10 also includes one or more heating elements, which can comprise any commercially available heating element. In the present embodiment, a pair of heating elements 26 are mounted to tank 16 and preferably to the side of tank 16 in the present embodiment. Elements 26 are electrically connected to an electronic controller 28 located in this embodiment in a recessed portion 30 of top pan 18. Elements 26 are mounted to the side wall of tank 16 by any of a variety of means well known to those of ordinary skill in the art, such as threads 46, and are preferably covered by plastic caps 32 which snap into position through openings in jacket 12. In the present embodiment, an upper foam dam 34 surrounds upper element 26 and extends between tank 16 and jacket 12. Similarly, lower foam dam 36 surrounds element 26 and spigot 38. Foam dam 36 also extends between jacket 12 and tank 16.

Each heating element 26 in the present embodiment includes a base 27, a resistance heater 29, a temperature sensor 44 and a pair of sensor connectors 45. The sensor 44 may be embedded in base 27 between opposing legs of the resistance heater 29. Alternatively, sensor 44 may be located on bracket 100 attached to element spud 101 and pressed against the side of tank jacket 12.

Electronic controller 28 connects to elements 26 by way of wires 40. In other embodiments not shown, the electronic controller 28 can be in wireless communication with elements 26, such as by RF, infrared or other suitable medium. Wires 40 extend between electronic controller 28 and elements 26 through the space between jacket 12 and tank 16. That space is otherwise filled with insulation 14. It is possible for wires 40 to be located such that foam-forming liquids form directly around wires 40 during the foaming process.

Also, wires 40 can be located within a passageway created within the foam, if desired, such as with tubes, pipes and the like. Electronic controller 28 is a user interface and in the present embodiment includes a water temperature adjustment dial 42 which can be rotated to select a variety of water temperatures at which the water within tank 16 will be maintained. A Mode Switch may also be included, as shown, to allow different operating logic to be used as is desired by the user.

Figure 5:
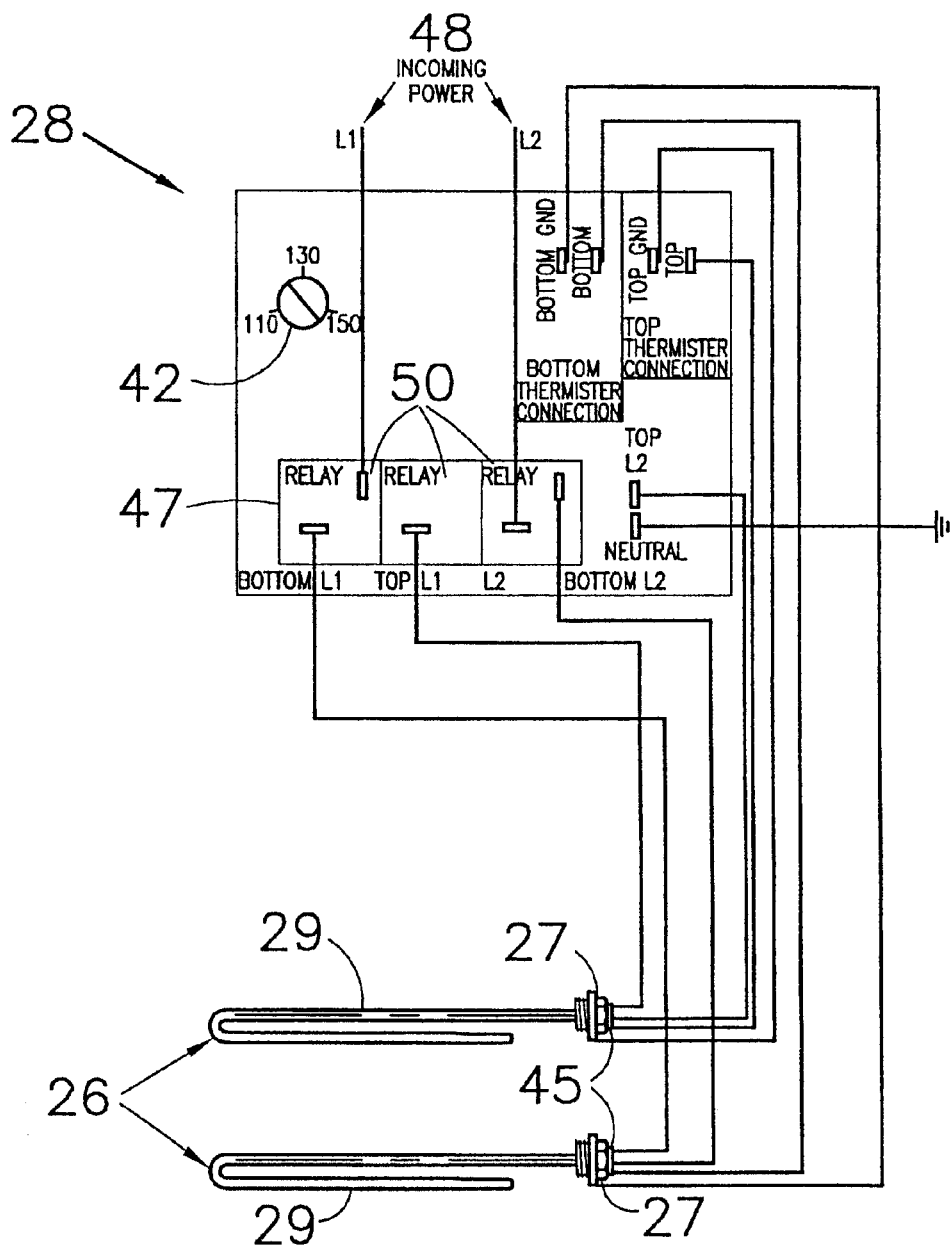
FIG. 5 discloses a circuit diagram of the control system of a water heater in accordance with aspects of the invention.
Figure 6:
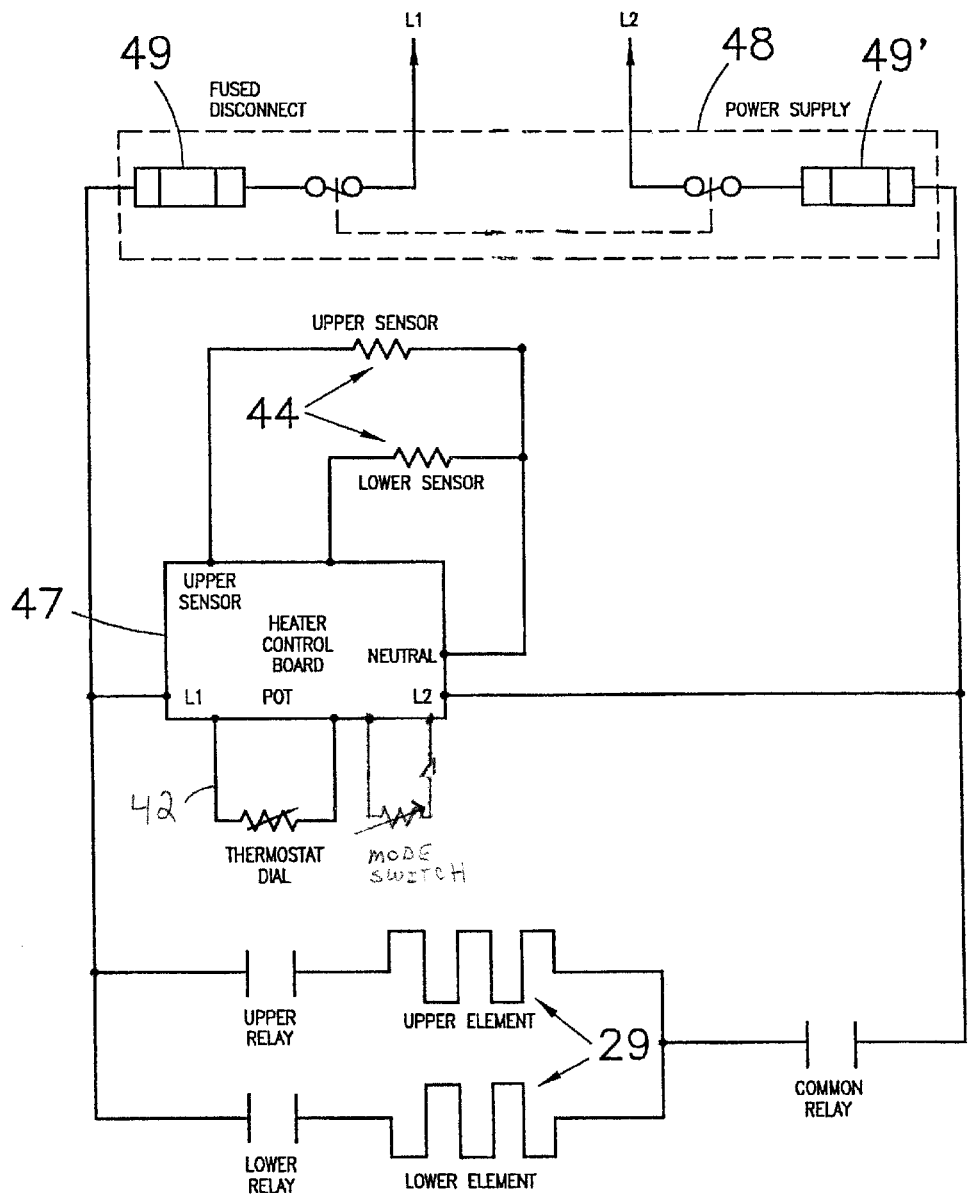
FIG. 6 shows a ladder diagram of the control system of a water heater in accordance with aspects of the invention.

The specifics of the connections and operations of one embodiment of electronic controller 28 and heating elements 26 shown in FIGS. 5 and 6. Sensor 44 is connected in a conventional manner through connectors 45 to electronic controller 28. Resistance heater 29 is also connected to heater control board 47 via relays 50 on heater control board 47. Electrical power is supplied to the system through power supply 48, which include fuses 49 and 49' for deenergizing the system in the event of an amperage surge.

Heater control board 47 preferably incorporates electronic control circuitry for controlling operation of the water heater, as described in more detail below. Such control circuitry may incorporate a number of electronic components, known to those of ordinary skill in the art, such as solid state transistors and accompanying biasing components, or one or more equivalent, programmable logic chips. The electronic control circuitry may also incorporate a programmable read only memory (PROM), random access memory (RAM) and a microprocessor.

The arrangement and/or programming of these components may take any number of forms well known to those of ordinary skill in the art to accomplish operation of the water heater as described below.

Turning now to operational aspects of the embodiment described above, when there is a call for hot water, hot water exits through outlet 24 and cold water is introduced through inlet 22. Sensors 44 detect the temperature of water within tank by being in contact with the water tank side wall. The temperatures of the sensors reflect the temperature of water in tank 16. Sensors 44 then send temperature information, typically in the form of an electrical signal, to controller 28. Controller 28 is programmed with predetermined differential set point temperatures to determine the temperature at which controller 28 energizes element 26. The predetermined differential set point can be made to be variable if desired. When the temperature of the water within tank 16 decreases to that predetermined differential set point, controller 28 detects such temperature information received from sensor 44 and energizes element 26. Element 26 continues in the energized state to heat the water until temperature information received from sensor 44 indicates that the water temperature has reached a predetermined set point.

The predetermined set point can be selected by adjustment dial 42 and is variable. When controller 28 detects that the second predetermined set point has been reached, controller 28 deenergizes element 26. The predetermined set point typically has variable settings for deenergizing elements 26. Such selectable settings are preferably between about 90° F.–180° F. The differential for energizing the elements can vary depending on the task to be performed.

In accordance with another embodiment of the invention, the controller 28 is programmed to utilize the lower sensor 44 to verify operation of the upper thermistor 44. The upper sensor 44 is used to preferably both detect over temperature conditions as well as control the function of the upper element 26. For this reason, safety considerations of the system require that correct readings are made by the upper sensor 44.

In this embodiment, the controller 28 monitors the temperatures detected by the upper sensor 44 and the lower sensor 44 at predetermined times and intervals to verify operation. Preferably, the programming of the controller 28 prompts either a status indicator and/or regulates operation of the water heater depending on a comparison of the differences between the temperatures detected by the upper and lower sensors 44 with a preset value stored in the controller 28. For example, in one especially preferred embodiment, the controller 28 is programmed to compare the temperatures of the upper and lower sensors 44 each time the lower element 26 is turned off.

In this illustrated embodiment, the temperatures measured by the upper and lower sensors 44 at the time just after the lower element 26 is switched off should be about the same. The reason is that the electric water heater 10 will not "stack"Stacking is a temperature gradient from bottom to top of the tank. For example, upon heating of the water in the tank 16 in operation, the upper element 26 will reheat water at the top of the tank very fast and the lower element 26 will heat the water in the lower portion of the tank much more slowly. As the water in the lower portion of the tank 16 approaches the set point, convection currents from the elements 26 start to mix the hot water at the top of the tank 16 with the warm water in the lower portion of the tank 16. Eventually, preferably the convection currents circulate the water in the entire tank 16, so that the water throughout tank 16 is of a substantially uniform temperature, and more preferably, at a uniform temperature when the lower element 26 is shut off.

The controller 28 is preferably programmed to shut down and more preferably to also send an error indicator where in two consecutive reads there is detected, for example, a ten degree Fahrenheit or greater difference between the upper and lower sensors 44 at the point when the lower element 26 is shut off. As should be understood, the controller 28 can be programmed to shut down the system and/or send an error indication at any desired temperature difference between the upper and lower sensors 44 and after any desired amount of repeatability. In this manner, both failure of the upper sensor 44 as well as malfunction or other improper operating condition can be detected. For example, thermistors normally fail open or shorted and they rarely fail in a manner that will cause the resistance to increase but not go open. In some instances, it is possible that the thermistor is not making good contact with the tank or is exposed to a low ambient temperature which causes the thermistor to give an incorrect reading.

In accordance with the present embodiment, preferably an additional feature of the water heater 10 is that failure of either one or both of the upper and lower elements 26 can also be detected, although as should be understood, each of these features are not required to be provided together in a single embodiment. For this purpose, the controller 28 is programmed to monitor changes in water temperature over time adjacent and preferably just above an element being energized. In the present embodiment, the controller 28 monitors both the upper and lower sensors 44 above the respective upper and lower elements 26. The controller 28 is programmed to monitor, over a defined time period following energizing of the corresponding elements 26, the changes in temperature detected by each of the sensors 44 against a predetermined temperature.

The defined time period is preferably set at one hour and the predetermined temperature is set at two degrees, although as should be understood, the controller 28 can be programmed having a defined time period of any desired duration and a predetermined temperature of any desired level. For example, any longer or shorter time duration or any higher or lower temperature is possible. Further, the controller 28 is preferably programmed to identify when the change in temperature detected by either the upper or lower sensor 44 does not increase to at least reach the predetermined temperature by the end of the defined time period, which signifies that a respective element is defective.

In this embodiment, the controller 28 identifies when the change in temperature sensed by a sensor 44 does not reach two degrees in the one hour following energizing of the corresponding element 26. In addition, the controller 28 can also be programmed to take further steps when a defective element is identified. In an especially preferred embodiment, the controller 28 is programmed to both send an error indication when a defective element is identified and continue operation of the water heater using the remaining good element 10.

The following will explain in detail the operation of controller 28 in accordance with the present embodiment following the detection of failure of either one of the upper and lower elements 26. Upon failure of the lower element 26, the controller 28 continues to operate the water heater 10 in the same manner as before the failure detection. In this manner, the water temperature in the top of tank 16 remains hot due to heating by the upper element 26. After a prolonged period of operation, there will be a reduction in the amount of hot water available from the water heater 10. In this embodiment, the controller 28 is programmed to send an error indication on failure of either one of the elements 26, which will be described in detail below. Accordingly, in operation following failure of the lower element 26, the user will notice a reduced amount of hot water available, which will alert the user of a potential problem even if the error indication was not received or noticed by the user.

Upon failure of the upper element 26, the controller 28 operates to give the lower element 26 priority, which effectively turns off the upper element 26 and heats the water in tank 16 with only the lower element 26. The water heater 10 will again continue to operate in this manner until the user receives and/or notices an error indication or the user notices a reduction in the amount of available hot water.

As indicated above, the water heater 10 in accordance with this embodiment is preferably adapted so that the controller 28 will send an error indication upon detection of sensor and element failure or malfunction. In accordance with this feature, any conventionally known visual and/or audible alarm can be used for this purpose. In a presently preferred embodiment, the water heater 10 includes a visual display associated with the controller 28. As shown in FIG. 3, the visual display 59 preferably is an LED display and is mounted on the heater control board 47, although other types of displays can also be provided and mounted at other locations on water heater 10.

In operation, one or a plurality of conventionally known LED devices can be utilized for this purpose, which are visible outside the junction box housing the controller 28. In this embodiment, a single LED is provided and operates in the following manner. The LED emits a steady glow when there are no detected system problems. An error signal from the controller 28 on detection of a system problem causes the LED to emit a flashing light. In addition, preferably the controller 28 is programmed so that the error signal will cause the LED to emit a specific flash sequence depending on the nature of the system problem, for example, "dry fire"thermistors open or shorted, failed elements and thermistors that are out of calibration or giving incorrect readings. As should be understood, the feature of a display is optional and may be eliminated where desired.

The water heater 10 can also include one or more of any various conventionally known dip tubes, which are generally designed to regulate mixing of hot and cold water inside of the tank. The mixing of the hot and cold water is partially the result of currents generated by the inward flow of cold water, by the outward flow of hot water, and by the convection currents established within the tank. One or more dip tubes 23 can be incorporated in the water heater 10 and designed to terminate at various locations to control the intake of cold water, to control the withdrawal of hot water and/or to minimize convection currents.

In accordance with another embodiment of the present invention, the controller 28 can also be programmed to detect a defective dip tube, such as instances where a dip tube has broken off, is damaged or has fallen into the tank 16, as examples. The controller 28 preferably monitors the water temperatures at the upper and lower sensors 44 to detect any abnormal temperature profiles; for example, a temperature inversion or a situation where the temperatures at the top and bottom portions of tank 16 cool together or at substantially the same rate. A temperature inversion where the top of tank 16 becomes cold before the bottom will only exist when the dip tube is defective. In a normal operating mode, the bottom portion of tank 16 will cool before the top portion cools. The monitoring can occur at any time, such as when upper element 26 is energized (turned on) as an example. In one embodiment, the controller 28 sends an error signal following detection of dip tube failure but still allows continued operation of the water heater 10.

The water heater 10 can also include additional features as well where desired. For example, in another embodiment, the controller 28 can also contain a lock-out set point which is preferably less than about 210° F. The control lock-out prevents elements 26 from energizing when the water temperature reaches an abnormal predetermined set point and the controller 28 will not permit energizing of elements 26 until controller 28 is reset by removing power and then subsequently reapplying power. This can be accomplished automatically by controller 28, thereby reducing and possibly eliminating the need for a mechanical reset control. Such a reset could be performed by a reset user interface 31 on controller 28. The sensing capabilities of sensors 44 are such that elements 26 can be energized and de-energize after only approximately 1.5 gallons of water have been drawn from tank 16. This compares to about 3.0 gallons of water removal in prior art constructions.

The following illustrates one particular sequence of operational steps to achieve operation of the water heater. When the water heater control system is first started, the control electronic circuitry of heater control board 47 records the initial temperature at bottom/top element 26 and then turns on the bottom/top element 26 for approximately four seconds (preferably ten seconds or less) and then off for two minutes. Heater control board 47 then records the file temperature of the bottom element 26 as measured through sensor 44 and calculates the difference between the final temperature and initial temperature.

If the difference between these temperatures is greater than, for example, five degrees, then heater control board 47 turns off both elements 26 through relays 50. Heater control board 47 then checks to see if system power has been turned off or reset through incoming power supply 48. Once the system has been reset, heater control board 47 then begins this process from start.

If, however, the temperature differential is less than five degrees, then heater control board 47 energizes bottom element 26 to heat the water in tank 16 until it reaches the temperature set on temperature adjust dial 42.

If the temperature of temperature adjust dial 42 is less than, for example, 110° F., then the top element 26 remains off. Otherwise, heater control board 47 checks the temperature at sensor 44 in upper element 26. If the temperature of sensor 44 in upper element 26 is equal to the temperature of dial 42 minus 5° F., then heater control board 47 does not energize upper element 26 until the temperature at sensor 44 in upper element 26 is less than the turn on temperature (which is typically the temperature set on temperature adjust dial 42 minus some increment such as 5°) minus 5° F. Heater control board 47 then energizes top element 26.

Heating of the water in tank 16 then continues in a conventional manner until the turn off temperature of temperature adjust dial 42 is achieved.

By energizing upper and lower elements 26 in the manner described above, the significant advantages of the invention can be achieved. For example, energizing the element briefly (e.g., about 1–10 seconds, preferably about 3–4 seconds) and detecting temperature with a sensor allows heater control board 47 to prevent elements 26 from being energized for long periods of time in a "dry fire" condition, thereby avoiding substantial degradation of the elements and significantly extending their life. Thus, the terms "substantially no degradation" refers to little or no element degradation that occurs for an element energization period of about 1 second and up to about 10 seconds. Energizing the element for longer than about 10 seconds can result in substantial degradation under dry fire conditions.

In this manner, if the detected temperature rises quickly over a short time interval, then there is little or no water in tank 16. Alternatively, if there is little or no change in the detected temperature over a short time interval, then there is sufficient water in tank 16.

Use of a thermistor allows for a much more accurate and responsive detection of temperature than the use of more conventional temperature-sensing technology, such as bimetallic strip. This allows the significant temperature changes which occur in a short period of time under a dry fire condition to be detected with only a short (e.g., about 1–10 seconds, preferably about 3 seconds) energizing of the heating element 26. In this way, a dry fire condition can be detected virtually immediately to prevent overheating of the element, which significantly reduces its useful life.

Use of sensors 44 eliminates the electromechanical thermostats and their associated foaming aprons, fiberglass batts and the like. Small doughnut-shaped foam dams surround the bases 27 and permit foam insulation to cover more surface area of the tank.

The following illustrates an alternative set of operational steps in accordance with the invention. In this embodiment of the invention, during control power up of the water heater, heater control board 47 checks to see if there is a need for heating of the water at lower element 26 by measuring the temperature at sensor 44 and comparing the measured temperature with that of temperature adjust dial 42. If such a demand exists, heater control board 47 energizes lower element 26 and continuously checks to see if the water heating demand is satisfied. Once this heating demand is satisfied, heater control board 47 then repeats this process for the upper element 26.

In an improved embodiment of the operation of the present invention, when the power is turned on controller 28 boots and then performs a "Dry Fire Test" to determine that the tank is full of water. If the test confirms that the tank is full of water, the control is allowed to proceed to normal operation. If the tank is empty, the control flashes an LED on visual display 59 with a sequence indicating the tank must be filled with water before operation can continue and then locks out the operation of the elements. To continue, controller 28 must be restarted, in which case the control repeats the dry fire test.

The test preferably consists of the following sequence of events:

1. Temperature sensor 44 located above uppermost element 26 is read and the temperature reading is stored for future reference.

2. The uppermost element 26 is energized for approximately 4 seconds.

3. Controller 28 executes a series of preferably three predetermined one-minute wait intervals followed by a two-second pulse of the element.

4. After the third pulse, controller 28 preferably waits an additional five minute interval and then reads the temperature sensor again.

5. A comparison is made between the initial and current reading to determine if the temperature has increased 5 degrees F or more. If the change is less than 5 degrees, the tank is determined to be full of water. Five degrees is preferred because tests show that in a dry tank the temperature will rise ten degrees or more and in a wet tank eddy currents can cause some upward temperature change. The five degrees is thus preferred to minimize false dry tank readings.

6. If the tank is determined to be full of water, controller 28 advances into the normal operation control loop. If the tank is determined not to be full of water, controller 28 executes a fault sequence which flashes the error on the LED display and waits, allowing no further operation of the control until it is reset.

The initial on-time of element 26 is intended to get the sheath temperature between 300° F. and 1000° F. in the cases of low and high watt density elements. The follow-on pulses are intended to maintain the temperature in that range and allow time for the heat to warm the temperature sensor. It will be appreciated by those of ordinary skill in the art that if the element is under water, these pulses will have little effect on the water temperature, thus the lack of upward temperature change detected by the sensor indicates that the element is in water.

Although this invention has been described in connection with specific forms thereof, it will be appreciated that a wide variety of equivalents may be substituted for the specific elements described herein without departing from the spirit of the scope of this invention as described in the appended claims. For example, water tank 16 may be made of a number of sizes and shapes and may be made from a wide variety of materials such as metals and/or plastics. Foam insulation 14 may similarly be made from any number of high energy efficient foam insulations well known in the art.

The bottom of the water tank 16 may have various shapes, either with lower flanges as shown or as a flat construction. Other modifications may be made, including use of foam insulation between the bottom of tank 16 and bottom pan 20. Also, outer jacket 12 may be made from any number of materials such as rolled metals, preferably steel, or extruded vinyl materials and the like. Also, top pan 18 and bottom pan 20 may be deep-drawn, stamped or the like, or be made from metal, plastic or other suitable materials. Various types of heating elements may be utilized so long as they are used in conjunction with sensors 44.

What is claimed is:

1. An electric water heater comprising:
   a water container;
   an element located to heat water in said water container;
   a sensor located to sense temperature proximate said element; and
   a controller connected to said element and said sensor, said controller being programmed to energize said element with at least one electrical pulse within a predetermined time interval, comparing temperature information received from said sensor with a predetermined temperature, and disengaging said element in the event that said temperature received from said sensor is greater than said predetermined temperature.

2. The water heater defined in claim 1, wherein said controller is programmed to energize said element with a plurality of electrical pulses within said predetermined time interval, and wherein the first of said plurality of electrical, pulses has a duration of approximately four seconds, and the remaining pulses have a duration of approximately two seconds.

3. The water heater defined in claim 1, wherein said predetermined time interval is between about 1 to 5 minutes.

4. The water heater defined in claim 1, wherein said sensor is a thermistor.

5. The water heater defined in claim 1, wherein said element comprises a base and a resistance heater, and said sensor is embedded in said base.

6. The water heater defined in claim 1, wherein said sensor is mounted against said water container proximate said element.

7. The water heater defined in claim 1, further comprising:
   a second element located above said element and positioned to heat said water; and
   a second sensor located to sense temperature proximate said second element, said second element and said second sensor being connected to said controller.

8. The water heater defined in claim 7, wherein the controller prevents energizing of said second element unless said element has been previously energized without a subsequent interruption of power to said controller and the temperature of water sensed by said second sensor is greater than or equal to the temperature of water sensed by said sensor.

9. The water heater defined in claim 7, wherein said controller is capable of energizing said second element when the temperature sensed by said second sensor is less than a predetermined temperature.

10. The water heater defined in claim 1, wherein said predetermined temperature is variable.

11. The water heater defined in claim 1, wherein said controller is capable of comparing temperature information received from said sensor with a second predetermined temperature and deenergizing said element based on the result thereof.

12. The water heater defined in claim 11, wherein said second predetermined temperature is variable.

13. The water heater defined in claim 11, wherein said controller is capable of comparing temperature information received from said sensor with a third predetermined temperature and engaging a controller lockout based on the result thereof.

14. The water heater defined in claim 13, wherein said controller lockout is disengaged by interrupting and then restoring power to said controller.

15. An electric water heater comprising:
   a water tank;
   an element located to heat water in said water tank;
   a thermistor located to sense temperature adjacent said element; and
   a controller connected to said element and said thermistor said controller being programmed to energize said element with at least one electrical pulse within a predetermined time interval, comparing temperature information received from said thermistor with a predetermined temperature difference, and deenergizing said element in the event that a sensed temperature over a predetermined time interval is greater than a predetermined temperature difference, wherein there is substantially no degradation of said element within said predetermined time interval.

16. The water heater defined in claim 15, wherein said controller is programmed to energize said element with a plurality of electrical pulses within said predetermined time interval, and wherein the first of said plurality of electrical pulses has a duration of approximately four seconds, and the remaining pulses have a duration of approximately two seconds.

17. The water heater defined in claim 15, wherein said predetermined time interval is between about 1 to 5 minutes.

18. The water heater defined in claim 15, wherein said element comprises a base and a resistance heater, and said sensor is embedded in said base.

19. The water heater defined in claim 15, wherein said sensor is mounted against said water container proximate said element.

20. The water heater defined in claim 15, further comprising:
   a second element located above said element and positioned to heat said water; and
   a second sensor located to sense temperature proximate said second element, said second element and said second sensor being connected to said controller.

21. The water heater defined in claim 20, wherein the controller prevents energizing of said second element unless said element has been previously energized without a subsequent interruption of power to said controller and the temperature of water sensed by said second sensor in greater than or equal to the temperature of water sensed by said sensor.

22. The water heater defined in claim 20, wherein said controller is capable of energizing said second element when the temperature sensed by said second sensor is less than a predetermined temperature.

23. The water heater defined in claim 18, wherein said predetermined temperature is variable.

24. The water heater defined in claim 18, wherein said controller is capable of comparing temperature information received from said thermistor with a second predetermined temperature and deenergizing said element based on the result thereof.

25. The water heater defined in claim 24, wherein said second predetermined temperature is variable.

26. The water heater defined in claim 24, wherein said controller is capable of comparing temperature information received from said sensor with a third predetermined temperature and engaging a controller lockout based on the result thereof.

27. The water heater defined in claim 26, wherein said controller lockout is disengaged by interrupting and then restoring power to said controller.

28. An electric water heater comprising:
   a water container;
   an element located to heat water in said water container;
   a sensor located to sense temperature proximate said element; and
   a controller connected to said element and said sensor, said controller being programmed to energize said element with a plurality of electrical pulses within a predetermined time interval, comparing temperature information received from said sensor with a predetermined temperature, and disengaging said element in the event that said temperature received from said sensor is greater than a predetermined temperature for said predetermined time interval.

29. The water heater defined in claim 28, wherein the first of said plurality of electrical pulses has a duration of approximately four seconds, and the remaining pulses have a duration of approximately two seconds.

30. The water heater defined in claim 28, wherein said predetermined time interval is between about 1 to 5 minutes.

31. The water heater defined in claim 28, wherein said sensor is a thermistor.

32. The water heater defined in claim 28, wherein said element comprises a base and a resistance heater, and said sensor is embedded in said base.

33. The water heater defined in claim 28, wherein said sensor is mounted against said water container proximate said element.

34. The water heater defined in claim 28, further comprising:
   a second element located above said element and positioned to heat said water; and
   a second sensor located to sense temperature proximate said second element, said second element and said second sensor being connected to said controller.

35. The water heater defined in claim 34, wherein the controller prevents energizing of said second element unless said element has been previously energized without a subsequent interruption of power to said controller and the temperature of water sensed by said second sensor is greater than or equal to the temperature of water sensed by said sensor.

36. The water heater defined in claim 34, wherein said controller is capable of energizing said second element when the temperature sensed by said second sensor is less than a predetermined temperature.

37. The water heater defined in claim 28, wherein said predetermined temperature is variable.

38. The water heater defined in claim 28, wherein said controller is capable of comparing temperature information received from said sensor with a second predetermined temperature and deenergizing said element based on the result thereof.

39. The water heater defined in claim 38, wherein said second predetermined temperature is variable.

40. The water heater defined in claim 38, wherein said controller is capable of comparing temperature information received from said sensor with a third predetermined temperature and engaging a controller lockout based on the result thereof.

41. The water heater defined in claim 40, wherein said controller lockout is disengaged by interrupting and then restoring power to said controller.

42. An electric water heater comprising:
   a water heater;
   an element located to heat water in said water container;
   a sensor located to sense temperature proximate said element; and
   a controller connected to said element and said sensor, said controller being programmed to energize said element with at least one electrical pulse within a predetermined timed interval, comparing temperature information received from said sensor with a predetermined temperature, and disengaging said element in the event that said temperature received from said sensor is greater than a predetermined temperature or said temperature time interval;
   wherein said controller is capable of comparing temperature information received from said sensor with an additional predetermined temperature and engaging a controller lockout based on the result thereof.

43. The water defined in claim 42, wherein said controller lockout is disengaged by interrupting and then restoring power to said controller.

44. An electric water heater comprising:
   a water tank;
   an element located to heat water in said water tank;
   a thermistor located to sense temperature adjacent said element; and
   a controller connected to said element and said thermistor, said controller being programmed through energized said element with at least electrical one pulse within a predetermined time interval, comparing temperature information received from said thermistor with a predetermined temperature difference, and deenergizing said element in the event that a sense temperature over a predetermined time interval is greater than a predetermined temperature difference, wherein there is substantially no degradation of said element within said predetermined time interval; and wherein said controller is capable of comparing temperature information received from said sensor with a third predetermined temperature and engaging a controller lockout based on the result thereof.

45. The water heater defined in claim 44, wherein said controller lockout is disengaged by interrupting and then restoring power to said controller.

46. An electric water heater comprising:

a water container;

an element located to heat water in said water container;

a sensor located to sense temperature proximate said element;

a controller connected to said element and said sensor, said controller being programmed to energize said element with a plurality of electrical pulses within a predetermined time interval, comparing temperature information received from said sensor with a predetermined temperature, and disengaging said element in the event that said temperature received from said sensor is greater than a predetermined temperature for said predetermined time interval;

wherein said controller is capable of comparing temperature information received from said sensor with an additional predetermined temperature, and engaging a controller lockout based on the results thereof.

47. The water heater defined in claim 46, wherein said controller lockout is disengaged by interrupting and then restoring power to said controller.

48. In an electric water heater comprising a water container:

an element located to heat water in said container;

a sensor located to sense temperature proximate said element; and a controller for monitoring sensed temperature of said sensor and operating to heat water in said water container to a preset temperature, wherein said controller further adjusts a control temperature of a water in the water container a defined amount from said preset temperature, wherein said at least one element is turned on, said element comprising a heat transmissive base member capable of extending through and sealingly engaging a wall of said water container, said base member having a recess containing a thermistor, members electrically connected to said thermistor extending outwardly of said base member to transmit temperature information to said controller, a heater coil extending outwardly from said base member into said water container.

49. In an electric water heater having a controller programmed to transmit power in the form of at least one electrical pulse within a predetermined time interval, to compare received temperature information with a predetermined temperature, and to disengaging in the event that said temperature received is greater than said predetermined temperature, a water heating system comprising:

a heat transmissive base member extending through and sealingly engage a wall of a water heater tank, said base member having a recess; a thermistor positioned in said recess;

members electrically connected to said thermistor and extending outwardly of said base member to transmit said temperature information to said controller;

a sheathing sealed to and extending outwardly from said base member and into said water heater tank;

a heating coil positioned within said sheathing; and members extending outwardly of said base member and electrically connected to said controller to transmit said power to said heating coil.

* * * * *